(12) United States Patent
Tiwari et al.

(10) Patent No.: US 10,856,249 B2
(45) Date of Patent: *Dec. 1, 2020

(54) METHOD AND SYSTEM FOR TRANSMISSION OF SUSI IN THE NAS PROCEDURE

(71) Applicant: NEC Corporation, Tokyo (JP)

(72) Inventors: Kundan Tiwari, Chennai (IN); Toshiyuki Tamura, Tokyo (JP); Sheeba Backia Mary Baskaran, Chennai (IN)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/688,763

(22) Filed: Nov. 19, 2019

(65) Prior Publication Data

US 2020/0092836 A1 Mar. 19, 2020

Related U.S. Application Data

(63) Continuation of application No. 16/281,786, filed on Feb. 21, 2019, now Pat. No. 10,499,357.

(30) Foreign Application Priority Data

Aug. 9, 2018 (IN) .............................. 201811029941

(51) Int. Cl.
*H04W 60/02* (2009.01)
*H04W 12/00* (2009.01)

(52) U.S. Cl.
CPC ..... *H04W 60/02* (2013.01); *H04W 12/00409* (2019.01)

(58) Field of Classification Search
CPC .................. H04W 60/02; H04W 12/00409
USPC ............... 455/435.1, 411, 432.1, 422.1, 418
See application file for complete search history.

(56) References Cited

U.S. PATENT DOCUMENTS

| | | | | |
|---|---|---|---|---|
| 5,930,710 A | * | 7/1999 | Sawyer | H04W 60/04 455/436 |
| 7,072,654 B2 | * | 7/2006 | Fujiwara | H04W 60/00 455/414.1 |
| 10,499,357 B1 | * | 12/2019 | Tiwari | H04W 12/00409 |
| 2002/0090945 A1 | | 7/2002 | Sasada | |
| 2019/0007500 A1 | * | 1/2019 | Kim | H04L 67/141 |
| 2019/0007992 A1 | * | 1/2019 | Kim | H04W 76/27 |
| 2019/0059067 A1 | | 2/2019 | Lee et al. | |

OTHER PUBLICATIONS

3GPP TS 33.501 V15.1.0 (Jun. 2018), "$3^{rd}$ Generation Partnership Project; Technical Specification Group Services and System Aspects; Security architecture and procedures for 5G system (Release 15)", pp. 1-152, (Jun. 2018).

(Continued)

*Primary Examiner* — Nghi H Ly
(74) *Attorney, Agent, or Firm* — Finnegan, Henderson, Farabow, Garrett & Dunner, L.L.P.

(57) ABSTRACT

The present disclosure is related to sending of a one time identifier of a UE during the NAS procedure. Specifically, the present disclosure relates to determining whether to use same one time identifier or different one time identifier during registration retry procedure.

10 Claims, 9 Drawing Sheets

(56) References Cited

OTHER PUBLICATIONS

3GPP TS 22.368 V14.0.1 (Aug. 2018), "3$^{rd}$ Generation Partnership Project; Technical Specification Group Services and System Aspects; Service requirements for Machine-Type Communications (MTC); Stage 1 (Release 14)", pp. 1-26, (Aug. 2017).
3GPP TS 24.501 V15.0.0 (Jun. 2018) 3$^{rd}$ Generation Partnership Project; "Technical Specification Group Technical Specification Group Core Network and Terminals", Non-Access Stratum (NAS) protocol for 5G System (5GS); Stage 3 (Release 15) , pp. 1-337, (Jun. 2018).
3GPP TS 24.501 v1.1.1, C1-183720 (was C1 183184), Qualcomm Incorporated; "Mechanism to limit frequency at which UE responds with SUCI in Identity Response message", 3GPP TSG CT WG1 Meeting #111, 18 pages, (May 2018).
3GPP TS 24.501 v1.1.1, C1-183184, Qualcomm Incorporated; "Mechanism to limit frequency at which UE responds with SUCI in Identity Response message", 3GPP TSG CT WG1 Meeting #111, 18 pages, (May 2018).
"3rd Generation Partnership Project; Technical Specification Group Services and System Aspects; Security Architecture and Procedures for 5G System (Release 15)", 3GPP TS 33.501 V0.3.0, Aug. 21, 2017.
International Search Report and Written Opinion PCT/JP2019/018455 dated Jun. 26, 2019.
Office Action, dated Apr. 27, 2020, issued by the United States Patent Office in counterpart U.S. Appl. No. 16/883,273.
Notice of Allowance dated Jul. 27, 2020, issued by the U.S. Patent and Trademark Office in co-pending U.S. Appl. No. 16/833,273.

* cited by examiner

METHOD AND SYSTEM FOR TRANSMISSION OF SUSI IN THE NAS PROCEDURE

CROSS-REFERENCE TO RELATED PATENT APPLICATIONS

This application is a continuation of U.S. patent application Ser. No. 16/281,786, filed Feb. 21, 2019, which claims priority from Indian Patent Application No. 201811029941, filed Aug. 9, 2018. The entire contents of the above-referenced applications are expressly incorporated herein by reference.

INCORPORATION BY REFERENCE

This application is based upon and claims the benefit of priority from Indian patent applications No. 201811029941, filed on Aug. 9, 2018, the disclosure of which is incorporated herein in its entirety by reference.

TECHNICAL FIELD

The present disclosure is related to sending of a one time identifier of a UE during the NAS procedure. Specifically, the present disclosure relates to determining whether to use same one time identifier or different one time identifier during registration retry procedure.

BACKGROUND ART

In 5GS (e.g. 3GPP TS 33.501), it is required for UEs to send Subscription Concealed Identifier (SUCI) that was encrypted from Subscription Permanent Identifier (SUPI) to the 3GPP network. The UE performs the encryption of SUPI with Public Key identity configured by the HPLMN and protection scheme. The encrypted identity is called Subscription Concealed Identity (SUCI). The SUCI is sent to the AMF in a Non Access Stratum message (e.g. Registration Request or Identity Request message). On receiving the SUCI, the AMF sends a message including SUCI to the AUSF and AUSF sends SUCI to UDM. The UDM de-conceals the SUCI to SUPI and sends it to AUSF and AUSF returns it to the AMF. The AMF now knows the SUPI of the user and performs the corresponding NAS procedure. SUCI is one time identifier.

SUMMARY

Although it is defined the SUCI as one time identifier, there are some scenarios where one time identity of the UE does not fit into the existing 3GPP NAS procedures. More specifically, it is not clear whether the UE uses a same one time identifier or a new one time identifier for sending the NAS message, when the UE is required to send the NAS message under some scenarios. This disclosure deals with four sub-problems that have the same route of problem.

It is mentioned that a SUCI is one time identifier. The one-time identifier (e.g. SUCI) is valid for only one NAS procedure. Therefore, with this definition, it is not clear whether the same SUCI is needed to be sent in all NAS messages which contains SUCI until registration procedure is successful. For example if the UE sends Initial Registration Request message with SUCI-1 and the UE didn't receive Registration Response message and retransmission timer expires then it is not clear whether the UE sends Registration Request message with SUCI-1 or calculates a new SUCI (e.g. SUCI-2) and sends SUCI-2 in the registration Request message.

Furthermore, a following scenario is considered. A UE is performing a Registration procedure when it does not have a valid 5G-GUTI and has sent Registration Request message with a SUCI but UE has not received the Registration Accept message. The UE will perform the de-registration procedure when the user presses power off button or the UE wants to perform de-registration procedure if the USIM is removed or 5GS capability is disabled. In this scenario it is not clear whether the UE sends De-Registration message with a new SUCI or De-registration message with same SUCI as the one sent in the Registration Request message. It is also not clear which SUCI (i.e. an old SUCI or a new SUCI) the UE will send and is required to transmit deregistration request message again when the UE didn't receive deregistration accept message.

In addition, according to the current 3GPP standard specification, when the network requests UE to send SUCI as requested identification in the identification procedure, the UE will send a SUCI and start timer T3519. While this timer is running and when the network requests SUCI in the identification request message, the UE will again send the same SUCI as sent in previous identification procedure. However it is not clear whether the UE will send the same SUCI or different SUCI if the UE transmits Registration request message or Deregistration request message after sending the SUCI in the identification procedure.

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter.

In order to overcome at least the problems as discussed above, the present disclosure provides solutions wherein in one aspect, a User Equipment (UE) sending, to an Access and mobility Management Function (AMF), a first Non Access Stratum (NAS) message that includes a first one-time identifier for identifying the UE, wherein the one-time identifier is valid for only one NAS procedure and is generated by encryption of a permanent identifier for permanently identifying the UE; and sending, to the AMF, a second NAS message that includes a second one-time identifier that is same as or different from the first one-time identifier, in a case where: a response message for the first NAS message was sent from the AMF and was lost before reception of the response message by the UE, or the first NAS message was used for responding to a request message that was sent from the AMF, the request message requesting that the UE sends the first one-time identifier to the AMF, wherein the first one-time identifier is reused as the second one-time identifier for sending the second NAS message, in a case where the second one-time identifier is same as the first one-time identifier; or generating the second one-time identifier by encryption of the permanent identifier for sending the second NAS message, in a case where the second one-time identifier is different from the first one-time identifier. The present disclosure also starting a timer when the first NAS message is sent; and using the second one-time identifier that is same as the first one-time identifier for sending the second NAS message, if the timer is running; or using the second one-time identifier that is different from the first one-time identifier for sending the second NAS message, if the tinier expires, wherein the one-time identifier is a Subscribed Unique Concealed Identifier (SUCI); and the permanent identifier is a Subscriber Unique Permanent Identifier (SUPI). It should be noted that the first NAS message is a Registration Request message or an Identity Response message; and the second NAS message is the Registration Request message or a Deregistration Request message.

In another aspect, the present disclosure provides solutions where a method for an Access and mobility Management Function (AMF) is provided. The method comprises the steps of receiving, from a User Equipment (UE), a first Non Access Stratum (NAS) message that includes a first one-time identifier for identifying the UE, wherein the one-time identifier is valid for only one NAS procedure and is generated by the UE using encryption of a permanent identifier for permanently identifying the UE; and receiving, to the UE, a second NAS message that includes a second one-time identifier that is same as or different from the first one-time identifier, in a case where: a response message for the first NAS message was sent to the UE and was lost before reception of the response message by the UE, or the first NAS message was used by the UE for responding to a request message that was sent from the AMF, the request message requesting that the UE sends the first one-time identifier to the AMF, wherein the first one-time identifier is reused by the UE as the second one-time identifier for sending the second NAS message, in a case where the second one-time identifier is same as the first one-time identifier; or the second one-time identifier is generated by the UE using encryption of the permanent identifier for sending the second NAS message, in a case where the second one-time identifier is different from the first one-time identifier.

The present disclosure also includes a timer that is equipped in the UE is started when the first NAS message is sent; and the second one-time identifier that is same as the first one-time identifier is used for sending the second NAS message, if the timer is running; or the second one-time identifier that is different from the first one-time identifier is used for sending the second NAS message, if the timer expires. Further, the one-time identifier is a Subscribed Unique Concealed Identifier (SUCI); and the permanent identifier is a Subscriber Unique Permanent Identifier (SUPI). According to the present disclosure, the first NAS message is a Registration Request message or an Identity Response message; and the second NAS message is the Registration Request message or a Deregistration Request message.

In an embodiment of the present disclosure, a User Equipment (UE) is provided wherein the user equipment comprises of a transceiver; and a controller configured to control the transceiver to send, to an Access and mobility Management Function (AMF), a first Non Access Stratum (NAS) message that includes a first one-time identifier for identifying the UE, wherein the one-time identifier is valid for only one NAS procedure and is generated by encryption of a permanent identifier for permanently identifying the UE; and send, to the AMF, a second NAS message that includes a second one-tune identifier that is same as or different from the first one-time identifier, in a case where: a response message for the first NAS message was sent from the AMF and was lost before reception of the response message by the UE, or the first NAS message was used for responding to a request message that was sent from the AMF, the request message requesting that the UE sends the first one-time identifier to the AMF, wherein the controller is further configured to: reuse the first one-time identifier as the second one-time identifier for sending the second NAS message, in a case where the second one-time identifier is same as the first one-time identifier; or generate the second one-time identifier by encryption of the permanent identifier for sending the second NAS message, in a case where the second one-time identifier is different from the first one-time identifier.

In an embodiment of the present disclosure, there is provided An Access and mobility Management Function (AMF) which is comprises of an network interface connected with a radio access network node; a controller configured to control the network interface to: receive, from a User Equipment (UE), a first Non Access Stratum (NAS) message that includes a first one-time identifier for identifying the UE, wherein the one-time identifier is valid for only one NAS procedure and is generated by the UE using encryption of a permanent identifier for permanently identifying the UE; and receive, to the UE, a second NAS message that includes a second one-time identifier that is same as or different from the first one-time identifier, in a case where: a response message for the first NAS message was sent to the UE and was lost before reception of the response message by the UE, or the first NAS message was used by the UE for responding to a request message that was sent from the AMF, the request message requesting that the UE sends the first one-time identifier to the AMF, wherein the first one-time identifier is reused by the UE as the second one-time identifier for sending the second NAS message, in a case where the second one-time identifier is same as the first one-time identifier; or the second one-time identifier is generated by the UE using encryption of the permanent identifier for sending the second NAS message, in a case where the second one-time identifier is different from the first one-time identifier.

BRIEF DESCRIPTION OF DRAWINGS

The foregoing and further objects, features and advantages of the present subject matter will become apparent from the following description of embodiments with reference to the accompanying drawings, wherein like numerals are used to represent like elements.

It is to be noted, however, that the appended drawings along with the reference numerals illustrate only typical embodiments of the present subject matter, and are therefore, not to be considered for limiting of its scope, for the subject matter may admit to other equally effective embodiments.

EMBODIMENTS

Figure 1:
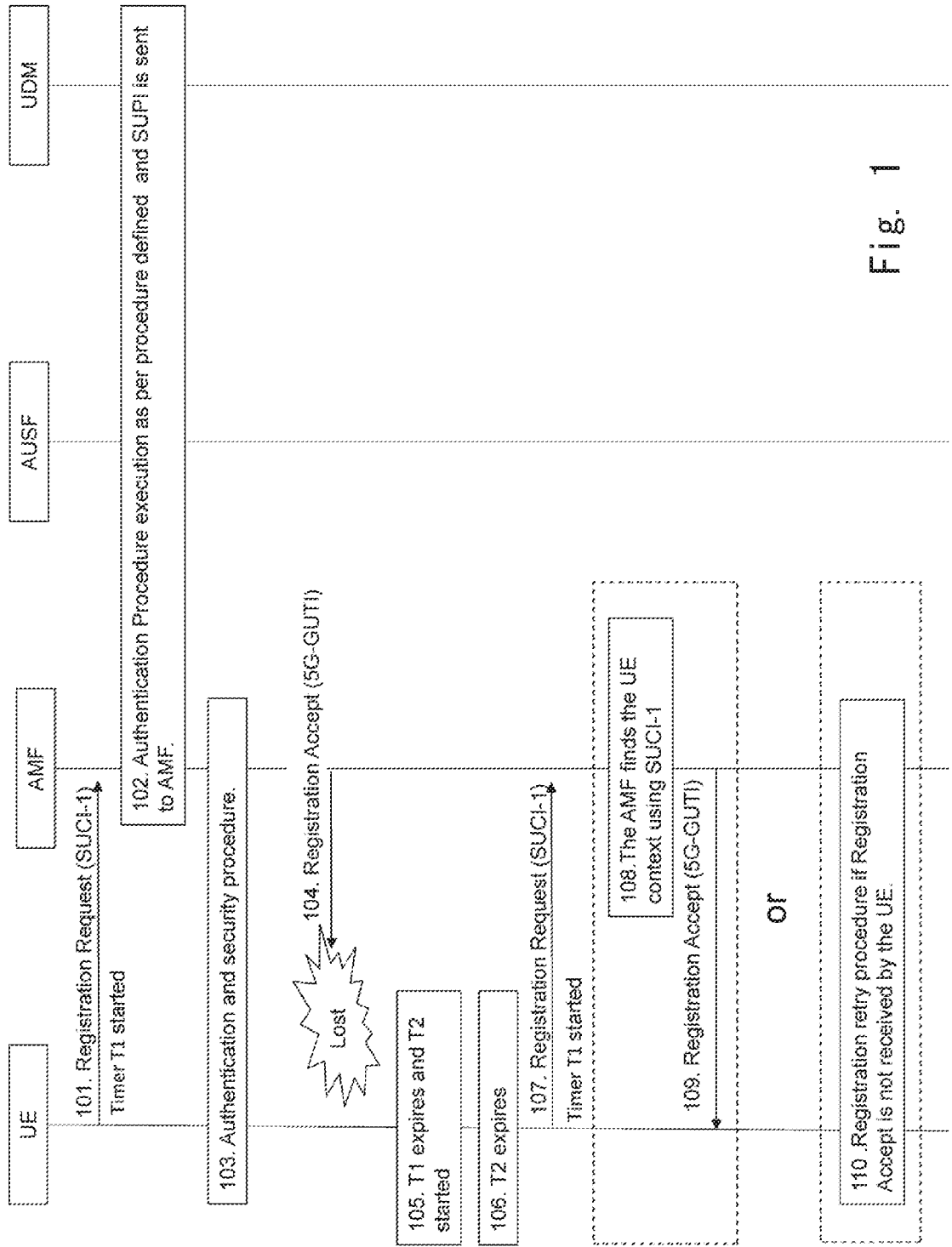
FIG. 1 illustrates Retransmission of Registration Request with same SUCI.

Embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular embodiments illustrated in the accompanying drawings is not intended to be limiting. In the drawings, like numbers refer to like elements.

It is to be noted, however, that the reference numerals in claims illustrate only typical embodiments of the present subject matter, and are therefore, not to be considered for limiting of its scope, for the subject matter may admit to other equally effective embodiments.

The specification may refer to "an", "one" or "some" embodiments) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

In an embodiment of the present disclosure as shown in FIG. 1, the detailed steps to send same SUCI in the Registration Request messages sent during Registration Retry procedure is described.

A UE does not have a valid 5G-GUTI or any temporary UE identifier before starting following steps. As shown, at 101, a UE initiates initial Registration procedure in a PLMN by transmitting Registration Request message containing a SUCI. The Registration Request message may include 5GS registration type information indicating Initial Registration. At 101, the UE starts a timer T1 (example T3510) with value a certain value (e.g. 10 seconds). The timer T3510 may be started when the UE initiates the registration procedure for initial registration by sending the Registration Request message to the AMF. At 102, the AMF receives the Registration Request message containing SUCI. The AMF may further receive the 5GS registration type information indicating initial Registration. The AMF creates a context for the UE and stores the UE parameters (e.g. SUCI and other parameters) sent in the Registration Request message. The AMF/SEAF triggers authentication with the UE by triggering Nausf_UEAuthentication service and the authentication function performed as per the procedure described in section 6.1 in 3GPP TS 33.501. At 103, the UE and the network performs authentication procedure and security mode control procedure. After the security mode control procedure is established successfully, the UE establishes a secure N1 NAS signaling connection. At 104, the AMF sends Registration Accept message containing a new 5G-GUTI. The UE cannot receive the Registration Accept message because of various reasons, e.g. (a) the Registration Accept message lost in the network due network issue or radio link failure happens; (b) N1 NAS signaling connection is released; and (c) Registration Response message was not received. When the timer T1 expires, as shown at 105, the UE aborts the registration procedure and releases the N1 NAS signaling connection if it exists. And then, at 105, the UE also starts another time T2 (example T3511 with value 10 s) with certain value. As shown, at 106 and 107, when the timer T2 expires, the UE transmits a Registration Request message containing same SUCI as sent in the Registration Request message in step 1. In other words, the UE reuses the SUCI that was sent in the Registration Request message in step 1 for sending a new Registration Request message. Furthermore, the UE starts timer T1. At 108, the AMF receives the second Registration Request message containing a SUCI. The AMF searches a UE context matching the SUCI. If the UE context is found then the AMF executes the remaining Registration procedure without executing authentication procedure with the UE as described in section 6.1 in 3GPP TS 33.501. The AMF uses the 5G security context present of the existing UE context. If the UE context is not found then the AMF initiate Authentication procedure as shown in 102. Further, at 109, the AMF transmits Registration Accept message containing either the 5G-GUTI assigned as shown in 104 or a new GUTI. After reception of the Registration Accept message the UE stops timer T1 and completes the Registration procedure. If the timer T1 expires and the UE haven't received the Registration accept message then the UE aborts the registration procedure and start timer T2. On the expiry of tinier T2 the UE again transmits Registration Request message containing the same SUCI as shown in 101. Additionally, as shown at 110, the method is repeated certain number of times if the UE does not receive Registration Accept message and in all retransmission of the Registration Request message contains same SUCI as shown in 101. After the certain number of retry of executing the step as shown in 110 (for example 5 times retransmission of Registration Request message starting from 1) and the UE does not receive the Registration Accept message then the UE either i) performs PLMN selection procedure and executes steps 1 to 9 in a new PLMN if the new PLMN is selected; or
ii) starts a timer T3 (e.g. T3502 with value) and on expiry of timer T3 conceal the SUPI again and generate a new SUCI and executes step 1-9 with the new SUCI.

In another scenario, the UE and the network executes steps 105 to 109, if the 5GS security context is not created in the UE and the network in step 103 due to some reasons (e.g. release of N1 signaling connection due to radio link failure or some other reasons).

In one example in step 101 and 107 the UE does not send Registration Request message with integrity protected even though the UE has a current 5G NAS security context i.e. the UE shall send Registration Request message without integrity protected if the Registration Request message contains a SUCI and the UE has current 5G NAS security context. The AMF processes the Registration Request message containing a SUCI if Registration Request message is not integrity protected and the AMF has a current 5G NAS security context. The AMF proceeds with the Registration procedure.

In another example in step 101 and 107 the UE sends Registration Request message with integrity protected using a current 5G NAS security context. The AMF shall not perform integrity check of the Registration Request message if the Registration Request message contains a SUCI and the AMF has a current 5G NAS security context. The AMF proceeds with Registration procedure.

Figure 2:
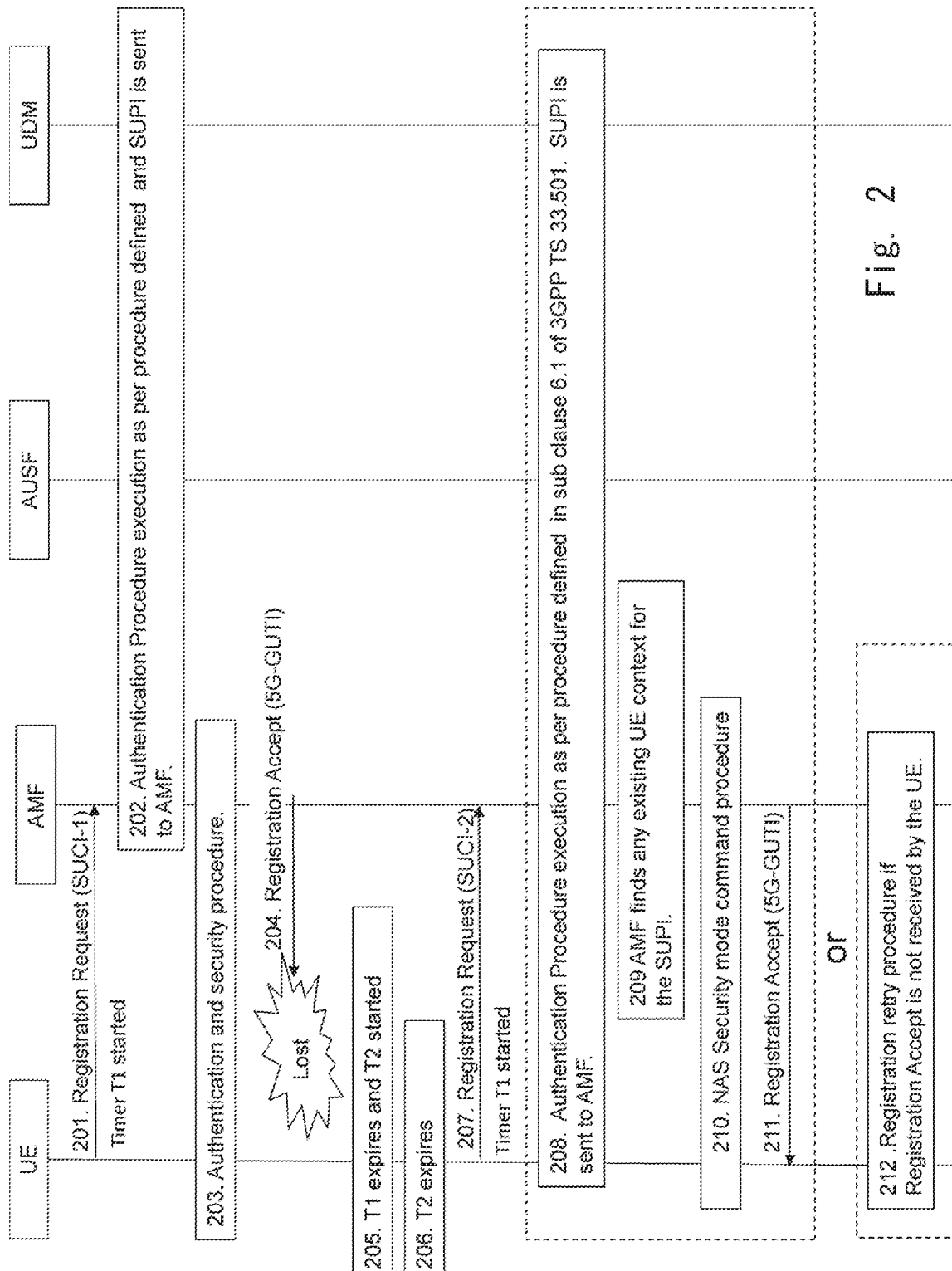
FIG. 2 illustrates a procedure of Retransmission of Registration Request with different SUCI in accordance with the present disclosure.

In embodiment of the present disclosure as shown in FIG. 2, the detailed steps to send a new SUCI in all Registration Request messages sent during Registration Retry procedure is disclosed wherein a UE does not have a valid 5G-GUTI or any temporary UE identifier. As shown at 201, a UE initiates initial Registration procedure in a PLMN by transmitting Registration Request message containing a SUCI. The Registration Request message may include 5GS registration type information indicating Initial Registration. The UE starts a timer T1 (example T3510) with value a certain value (e.g. 10 seconds). The AMF receives the Registration Request message containing SUCI. The AMF may further receive the 5GS registration type information indicating initial Registration. The AMF creates a context for the UE and stores the UE parameters (e.g. SUCI and other parameters) sent in the Registration Request message. At 202, the AMF/SEAF triggers authentication with the UE by triggering Nausf_UEAuthentication service and the authentication function performed as per the procedure described in section 6.1 in 3GPP TS 33.501. At 203, the UE and the network performs authentication procedure and security mode control procedure. After the security mode control procedure is established successfully, the UE establishes a secure N1 NAS signaling connection. At 204, the AMF sends Registration Accept message containing a new 5G-GUTI. However, the UE cannot receive the Registration Accept message because of various reasons, e.g. (a) the Registration Accept message lost in the network due network issue or radio link failure happens; (b) N1 NAS signaling connection is released; (c) Registration Response message was not received. Therefore, when the timer T1 expires as shown at 205, the UE aborts the registration procedure and releases the N1 NAS signaling connection if it exists. And then at 205 only, the UE starts another time T2 (example T3511 with value 10 s) with certain value. At 206, when the timer T2 expires, the UE conceals (e.g. encrypts) the SUPI again and generates a new SUCI and transmits a Registration Request message containing the new SUCI. At 207, the AMF receives the second Registration Request message containing a new SUCI. The AMF searches a UE context matching the SUCI. If the UE context is found then the AMF executes the remaining Registration procedure without executing authentication procedure as described in section 6.1 in 3GPP TS 33.501. The AMF uses the 5G security context present of the existing UE context. If the UE context is not found then the AMF initiate Authentication procedure as shown at 208 and as described in section 6.1 in 3GPP TS 33.501. The AMF gets SUPI and a new 5G security parameters. At 209, the AMF searches if any UE context exists for the SUPI and if the UE context exists in the AMF for the UE then the AMF perform integrity protection check using the old 5G security contexts as received in step 2. After successful Integrity check of the Registration Request message the AMF initiates NAS security mode command procedure as shown at 210 using the new 5G security received in step 208 as per section 6.7.2 in 3GPP TS 33.501. At 211, the AMF transmits Registration Accept message containing either the GUTI assigned in the step 204 or a new GUTI assigned. If the integrity check of Registration Request message fails in step 209 then the AMF abort the Registration procedure. In one example, in step 209 if the integrity checks of Registration Request message fails then also the AMF proceeds with the ongoing registration procedure. After reception of the Registration Accept message the UE stops timer T1 and completes the Registration procedure. If the timer T1 expires and the UE didn't receive the Registration accept message then the UE aborts the registration procedure and start timer T2. On expiry of timer T2 the UE again transmits Registration Request message containing a new SUCI. The step, as shown at 212, is repeated certain number of times if the UE does not receive Registration Accept message and in all retransmission of the Registration Request message contains a new SUCI. After the certain number of retry of step 209 (for example 5 times retransmission of Registration Request message starting from step 1) and the UE does not receive the Registration Accept message then the UE either:

i) performs PLMN selection procedure and executes step 1 to 9 in a new PLMN if the new PLMN is selected; or
ii) starts a timer T3 (e.g. T3502 with value) and on expiry of timer T3 calculate a conceal the SUPI again and generate a new SUCI and executes step 1-12 with the new SUCI.

In another scenario, the UE and the network executes steps 205 to 212, if the 5GS security context is not created in the UE and the network in step 3 due to some reasons (e.g. release of N1 signaling connection due to radio link failure or some other reasons).

In one example in step 207 the UE does not send Registration Request message with integrity protected even though the UE has a current 5G NAS security context i.e. the UE shall send Registration Request message without integrity protected if the Registration Request message contains a SUCI and the UE has a current 5G NAS security context. The AMF processes the Registration Request message containing a SUCI if the current 5G NAS security context exists in the AMF and the Registration Request message is not integrity protected. The AMF proceeds with the Registration procedure.

In another example in step 207 the UE sends a Registration Request message with integrity protected using current 5G NAS security context created in step 203. The AMF shall not perform integrity check of the Registration Request message if the Registration Request message contains a SUCI and the AMF has a current 5G NAS security context for the UE. The AMF proceeds with Registration procedure.

Figure 3:
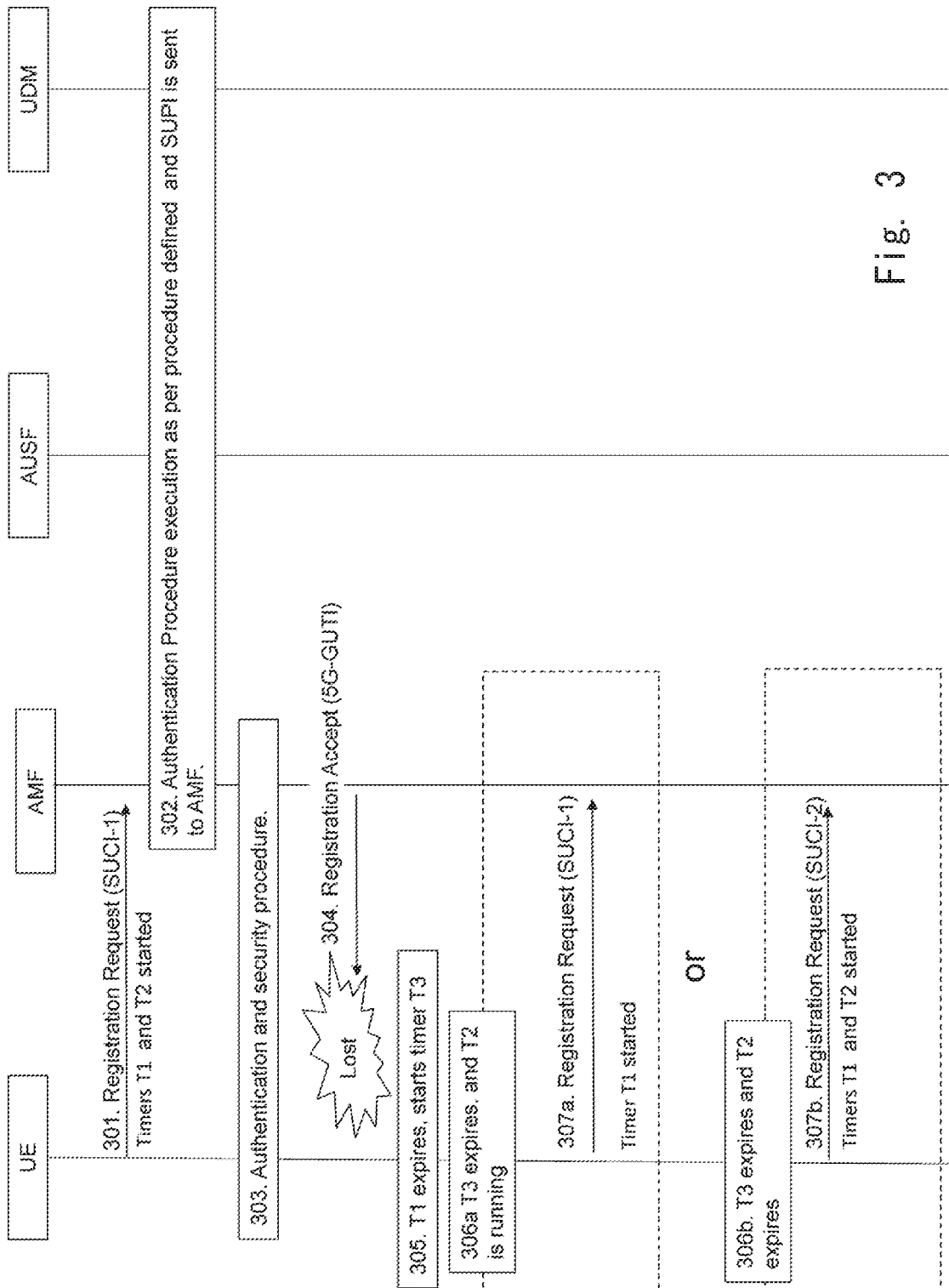
FIG. 3 illustrates another procedure of Retransmission of Registration Request with same SUCI while a SUCI reuse timer is running, according to the present disclosure.

In another embodiment of the present disclosure as shown in FIG. 3, the detailed steps to send same SUCI in the Registration Request messages when a SUCI reuse timer is running otherwise send a new SUCI in the Registration Request message are described wherein a UE does not have a valid 5G-GUTI or any temporary UE identifier. A UE initiates, as shown at 301, an initial Registration procedure in a PLMN by transmitting Registration Request message containing a SUCI. The Registration Request message may include 5GS registration type information indicating Initial Registration. The UE starts a timer T1, at 301 (example T3510) with value a certain value (e.g. 10 seconds). The UE also starts a timer T2, at 301 as well. The Timer T2 is linked with the SUCI that is populated in the Registration Request message. The AMF receives the Registration Request message containing SUCI. The AMF may further receive the 5GS registration type information indicating initial Registration. The AMF creates a context for the UE and stores the UE parameters (e.g. SUCI and other parameters) sent in the Registration Request message. The AMF/SEAF triggers authentication, at 302, with the UE by triggering Nausf_UEAuthentication service and the authentication function performed as per the procedure described in section 6.1 in 3GPP TS 33.501. At 303, the UE and the network performs authentication procedure and security mode control procedure. After the security mode control procedure is established successfully, the UE establishes a secure N1 NAS signaling connection. At 304, the AMF sends Registration Accept message containing a new 5G-GUTI. If the timer T1 expires, then the present disclosure starts timer T3 as shown in 305. If the timer T3 expires, as shown at 306a, then the UE checks if Timer T2 is running. If Timer T2 is running then the UE transmits Registration Request message, at 307a, with the same SUCI sent, in the step 301, and start timer T1. In other words, the UE reuses the SUCI that was sent in the Registration Request message in step 301 for sending a new Registration Request message. Further, if the tinier T3 expires then the UE checks, if Timer T2 is running. If Timer T2 also expires, i.e. T2 is not running as shown at 306b, then the UE transmits Registration Request message containing a new SUCI, at 307b. The UE starts timer T1 and T2. In other words, the UE generates the new SUCI by encryption of the SUFI for sending a new Registration Request message. After step 305a to 306a or 305b to 306b, the network and the UE completes the Registration procedure. In another scenario, the UE and the network executes steps 305 to 306, if the 5GS security context is not created in the UE and the network in step 303 due to some reasons (e.g. release of N1 signaling connection due to radio link failure or some other reasons).

In one example in step 301, 307a and 307b, the UE shall not send a Registration Request message with integrity protected even though the UE has a current 5G NAS security context i.e. the UE shall send Registration Request message without integrity protected if the Registration Request message contains a SUCI and the UE has a current 5G NAS security context. The AMF processes the Registration Request message containing a SUCI if Registration Request message is not integrity protected and the AMF has a current 5G NAS security context for the UE. The AMF proceeds with the Registration procedure.

In another example in step 301, 307a and 307b, the UE sends Registration Request message with integrity protected using a current 5G NAS security context. The AMF shall not perform integrity check of the Registration Request message if the Registration Request message contains a SUCI and the AMF has a current 5G NAS security for the UE. The AMF proceeds with Registration procedure.

Figure 4:
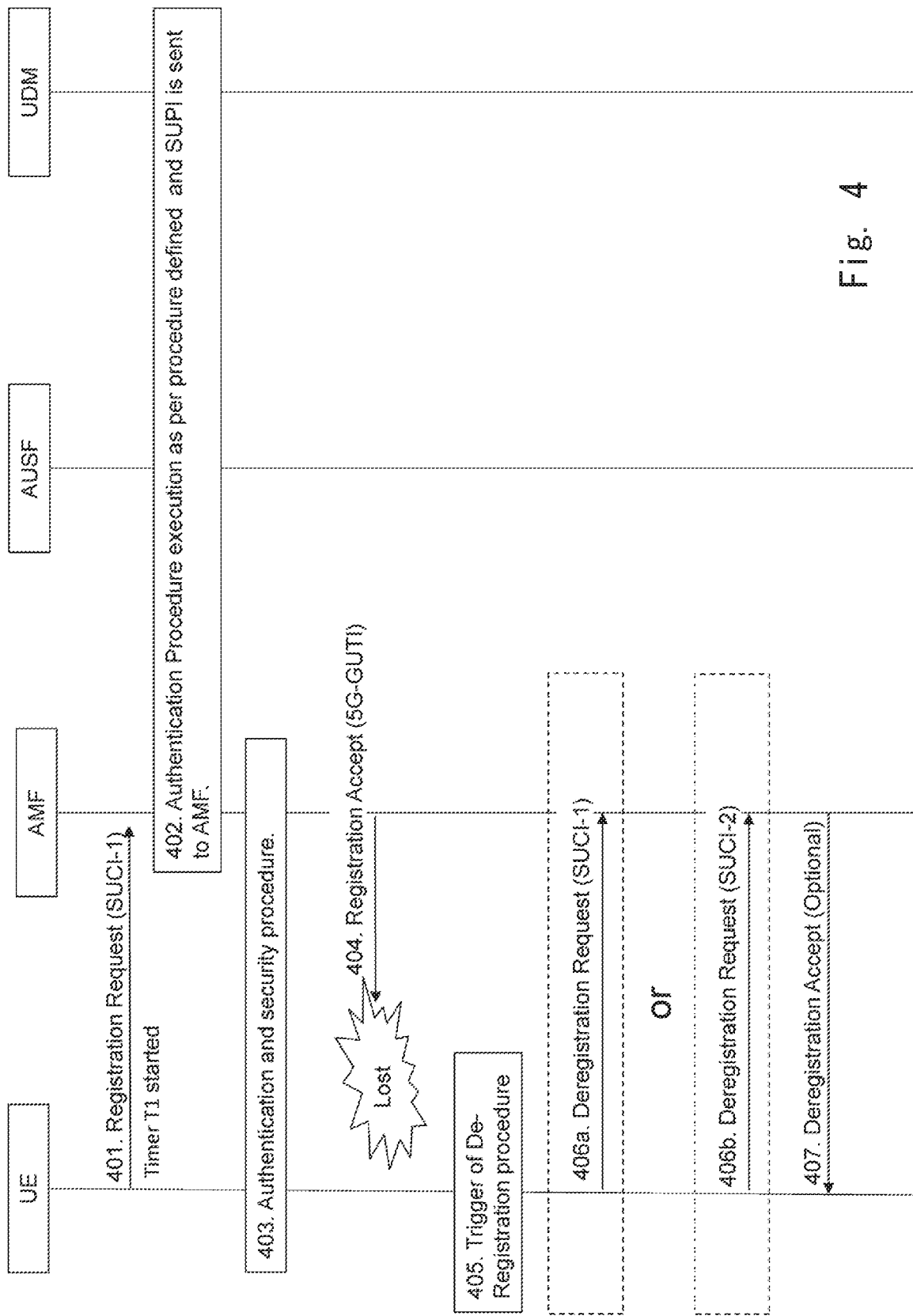
FIG. 4 illustrates a procedure of Transmission of Deregistration Request message when 5G-GUTI is not assigned in accordance with the present disclosure.

In another embodiment of the present disclosure, as shown in FIG. 4, the detailed steps for sending same SUCI as in Deregistration Request message as sent in the last Registration Request message or sending a new SUCI in Deregistration Request are disclosed wherein a UE does not have a valid 5G-GUTI or any temporary UE identifier. A UE, at 401, initiates an initial Registration procedure in a PLMN by transmitting a Registration Request message containing a SUCI. The Registration Request message may include 5GS registration type information indicating initial Registration. The UE starts a timer T1, at 401, (example T3510) with value, a certain value such as e.g. 10 seconds. The AMF receives the Registration Request message containing SUCI. The AMF may further receive the 5GS registration type information indicating Initial Registration. The AMF creates a context for the UE and stores the UE parameters (e.g. SUCI and other parameters) sent in the Registration Request message. The AMF/SEAF triggers authentication, at 402, with the UE by triggering Nausf_UEAuthentication service and the authentication function performed as per the procedure described in section 6.1 in 3GPP TS 33.501. The UE and the network performs authentication procedure, at 403, and security mode control procedure. After the security mode control procedure is established successfully, the UE establishes a secure N1 NAS signaling connection. At 404, the AMF sends Registration Accept message containing a new 5G-GUTI. At 405, the UE initiates a deregistration procedure due to power off, USIM is removed or 5GS capability is disabled. The UE performs either step 406a or 406b, wherein at step 406a the UE sends deregistration Request message containing same SUCI as sent in the last sent Registration request message to the AMF in step 401. In other words, the UE reuses the SUCI that was sent in the Registration Request message in step 401 for sending a Deregistration Request message. Further, at 406b, the UE conceals (e.g. encrypts) the SUPI again and generates a new SUCI and transmits deregistration message containing a new SUCI to the AMF. And then, the AMF executes one of the following steps:

i) The AMF triggers a new service to de-conceal a SUCI to a SUPI by sending a first message containing SUCI to AUSF, the first message indicating AUSF to de-conceal the SUCI to the SUPI. The AUSF sends a second message containing the SUCI to the UDM requesting the UDM to de-conceal the SUCI to SUPI. The UDM de-conceals the SUCI to the SUPI and transmits a third message containing the SUPI to the AUSF. The AUSF on receiving the SUPI transmits a forth message containing the SUPI to the AMF. The first message may be denoted as a new message "Nausf_SUCI_deconceal Request message (SUCI)". The second message may be also denoted as a new message "Nudm_SUCI_deconceal Request (SUCI)". The third message may be also denoted as a new message "Nudm_SUCI_deconceal Response (SUPI)". The forth message may be also denoted as a new message "Nausf_SUCI_deconceal Response (SUPI)".

ii) The AMF triggers authentication procedure with the UE by transmitting a message Nausf_UEAuthentication_Authenticate Request (SUCI, SUCI_Deconcealing_only) to the AUSF containing an indicator SUCI_Deconcealing_only requesting network to only de-conceal the SUCI and the AMF does not perform authentication procedure. The AUSF on receiving Nausf_UEAuthentication_Authenticate Request (SUCI, SUCI_Deconcealing_only) transmits a message Nudm_UEAuthentication_Get Request (SUCI, Serving Network name, SUCI_Deconcealing_only) to the UDM. The UDM on receiving the Nudm_UEAuthentication_Get Request (SUCI, Serving Network name, SUCI_Deconcealing_only) checks whether the message contains indicator SUCI_Deconcealing_only to perform de-concealing of SUCI only. If the message contains the indicator SUCI_Deconcealing_only, then the UDM de-conceals the SUCI to a SUPI and sends a response message Nudm_UEAuthentication_Get Response (SUPI) containing the SUPI. The UDM does not perform Authentication procedure. Upon receiving the Nudm_UEAuthentication_Get Response (SUPI) message, the AUSF transmits the message Nausf_UEAuthentication_Authenticate Response (SUPI) containing the SUPI to the AMF.

iii) The AMF performs procedure as defined in the section 6.1 in 3GPP TS 33.501. The AMF receives SUPI and 5G-Security parameters.

The AMF on receiving the SUPI from AUSF searches the UE context related to SUPI. In case i) and ii), in this step, if the UE context is found and Deregistration procedure is not due to switch off, then the AMF sends Deregistration accept message and completes the deregistration procedure. If the deregistration procedure is due to switch off, then the AMF completes the deregistration procedure and does not send de-registration accept message.

In case iii) after finding the UE context, the network performs authentication procedure with a new 5G security parameters received from UDM and then sends Deregistration Response message using new security context. In other case the AMF ignores the new 5G security parameters received from UDM and uses the existing security context to send Deregistration Response message. At 407, the AMF may send a deregistration accept message to the UE.

In another scenario the UE and the network executes steps 405 to 407, if the 5GS security context is not created in the UE and the network in step 403 clue to some reasons (e.g. release of N1 signaling connection due to radio link failure or some other reasons before step 403 has been executed successfully).

In one example in the step 401, 406a anti 406b, the UE does not send Registration Request message or Deregistration Request message with integrity protected even though the UE has a current 5G NAS security context i.e. the UE shall send Registration Request message without integrity protected if the Registration Request message contains a SUCI and the UE has a current 5G NAS security context or the UE shall send Deregistration Request message without integrity protected if the Deregistration Request message contains a SUCI and the UE has a current 5G NAS security context. The AMF processes the Registration Request message containing a SUCI if Registration Request message is not integrity protected and the AMF has a current 5G NAS security context for the UE. The AMF proceeds with the registration procedure. The AMF processes the Deregistration Request message containing a SUCI if Deregistration Request message is not integrity protected and the AMF has a current 5G NAS security context for the UE. The AMF proceeds with the Deregistration procedure.

In one example in the step 401, 406a and 406b, the UE sends Registration Request message or Deregistration Request message with integrity protected if the UE has a current 5G NAS security context. The AMF shall not perform integrity check on Registration Request if Registration Request message contains a SUCI and the AMF has a current 5G security context. The AMF proceeds with the registration procedure. The AMF shall not perform integrity check on Deregistration Request message if the Deregistration Request message contains a SUCI and the AMF has a current 5G NAS security context. The AMF proceeds with the deregistration procedure.

In one example of this embodiment, in step 406a and 406b, if the UE is in 5GMM IDLE state then the UE sends the same Requested NSSAI during the RRC connection establishment procedure which was sent in the step 401 during RRC connection establishment procedure. This Requested NSSAI is used to send the Deregistration Request message to the same AMF to which Registration Request message was sent in step 401.

In one example the in step 406a and 406b, the UE shall send same UE identity during RRC connection establishment procedure (e.g. in RRC Connection Request message) which was sent during RRC connection establishment procedure (e.g. RRC Connection Request message) in step 401. The NG-RAN node shall use this UE identity to send the Deregistration Request message in 406a and 406b to the AMF to which the Registration Request message was sent in the step 401. This procedure is used for the case when the NG-RAN still have the N2 connection established with the AMF for the UE.

Figure 5:
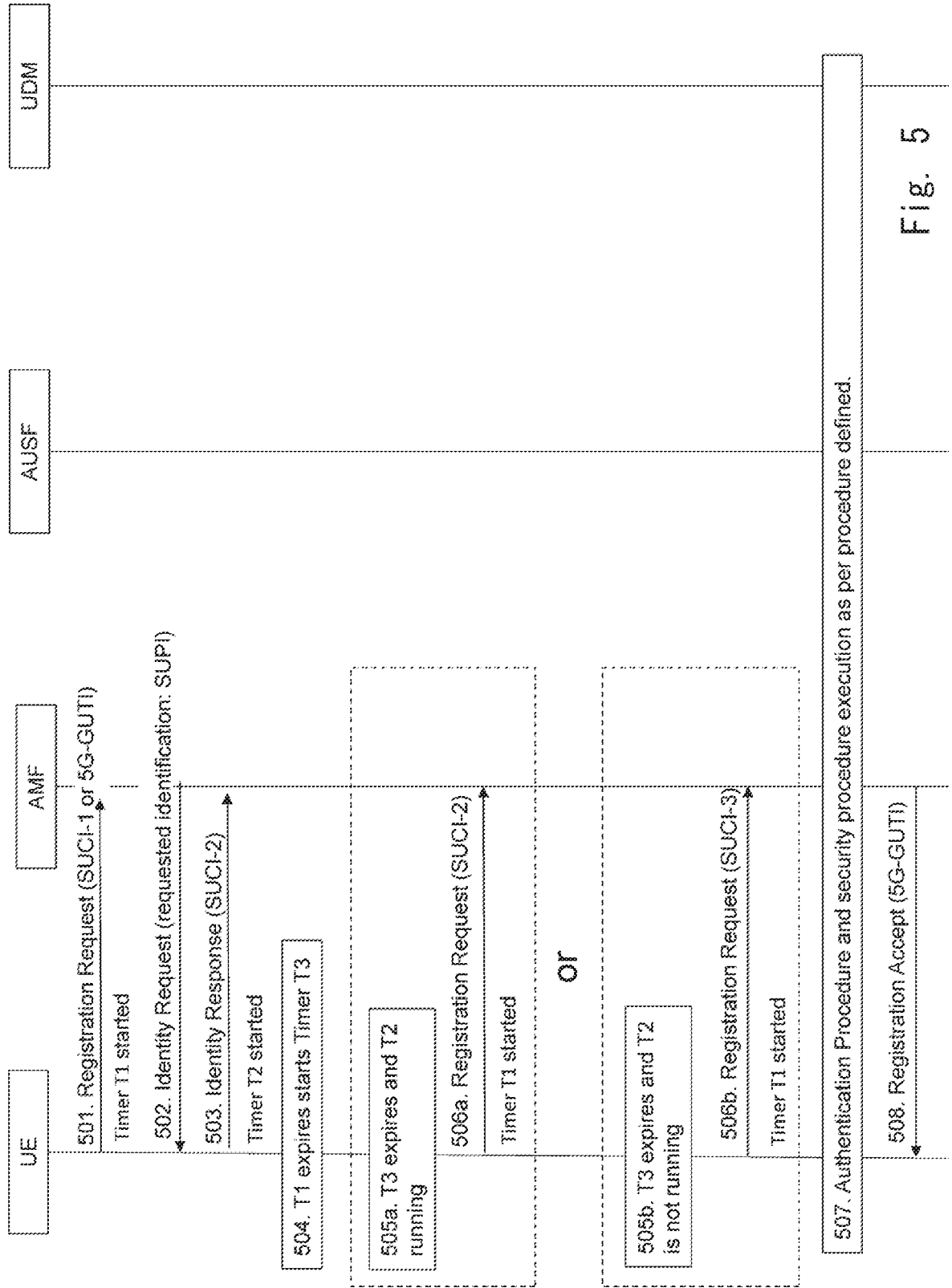
FIG. 5 illustrates a procedure of Transmission of SUCI in Registration. Request message after Identity Response message transmission containing a SUCI in accordance with the present disclosure.

In another embodiment of the present disclosure as shown in FIG. 5, the detailed steps for sending last SUCI, which was sent to the network in Identity Response message, in the Registration Request message if SUCI reuse timer is running are described wherein a UE sends, at 501, a Registration Request message to an AMF of a PLMN. The Registration Request message contains a 5G-GUTI if it has valid a 5G-GUTI, or a SUCI (SUCI 1 in the FIG. 5) if the UE does not have any valid 5G-GUTI. The Registration Request message may contain other temporary identifier. The UE starts a timer T1 (e.g. in 5GS T3510), at 501. The AMF after receiving the Registration Request message, transmits an Identity Request message, at 502, requesting to the UE to send SUCI. The UE on receiving SUCI, at 503, transmits a new SUCI (SUCI 2 in the FIG. 5) in identity Response message and start a timer T2. At 504, when the timer T1 expires then the UE starts timer T3. Therefore, there could be two options, either steps 505a to 506a or steps 505b to 506b, to be taken when the UE resends the Registration Request message to the AMF due to T3 expiration. At steps, 505a-506a, when the timer T3 expires but T2 is still running, the UE resends the Registration Request message to the AMF containing the SUCI (SUCI 2 in the FIG. 5) sent in the identity response message in step 503. In other words, the UE reuses the SUCI that was sent in the Identity Response in step 503 for sending a new Registration Request message if the T2 is still running. At steps, 505b-506b, when the timer T1 expires and T2 is not running, the UE resends the Registration Request message to the AMF containing a new SUCI (SUCI 3 in the FIG. 5). In other words, the UE generates the new SUCI by encryption of the SUPI for sending a new Registration Request message if the T2 expires. At 507, the AMF performs the authentication procedure and security mode control procedure after the AMF receives the Registration Request message containing SUCI (SUCI 2 in the FIG. 5). At 508, the AMF sends Registration Accept message containing a new 5G-GUTI.

In one example the Registration Request message sent after step 503 always contains a new SUCI derived from the SUPI i.e. the Registration Request message in step 506a and 506b contains a new SUCI derived from SUPI.

In one example in step 501, 506*a* and 506*b*, the UE does not send. Registration Request message with integrity protected even though the UE has a current 5G NAS security context i.e. the UE shall send Registration Request message without integrity protected if the Registration Request message contains a SUCI and the UE has current 5G NAS security context. The AMF processes the Registration Request message containing a SUCI if Registration Request message is not integrity protected and the AMF has a current 5G NAS security context. The AMF proceeds with the Registration procedure.

In another example in step 501, 506*a* and 506*b*, the UE sends Registration Request message with integrity protected using a current 5G NAS security context. The AMF shall not perform integrity check of the Registration Request message if the Registration Request message contains a SUCI and the AMF has a current 5G NAS security context. The AMF proceeds with Registration procedure.

Figure 6:
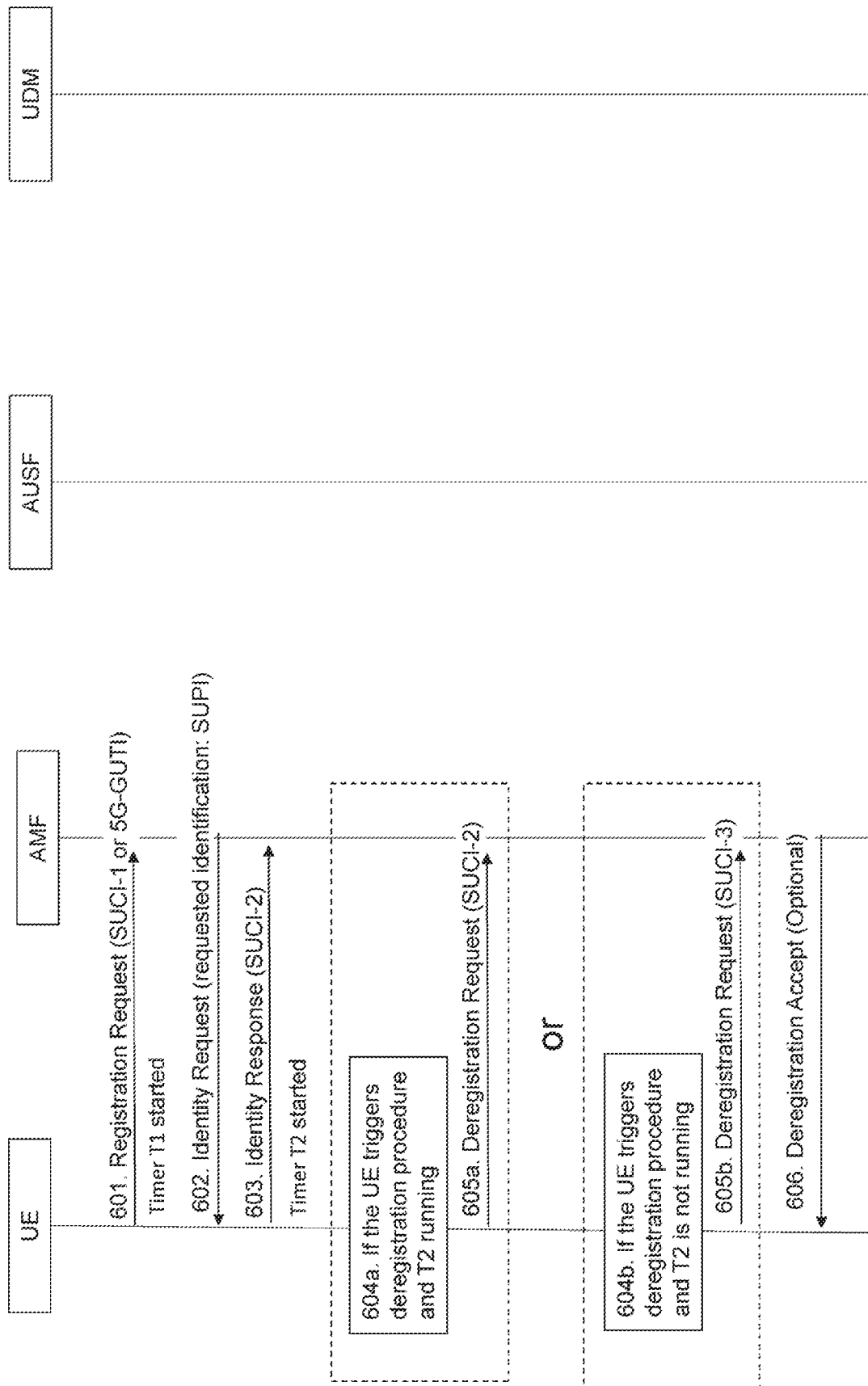
FIG. 6 illustrates a procedure of Transmission of SUCI in Deregistration Request message after Identity Response message transmission containing a SUCI.

In another embodiment of the present disclosure as shown in FIG. 6, the detailed steps for sending last SUCI, which was sent to the network in Identity Response message, in a Deregistration Request message if SUCI reuse timer is running are described wherein a UE sends a Registration Request message, at 601, to an AMF of a PLMN. The Registration Request message contains a 5G-GUTI if it has valid a 5G-GUTI, or a SUCI (SUCI 1 in the FIG. 6) if the UE does not have any valid 5G-GUTI. The Registration Request message may contain other temporary identifier. The UE starts a timer T1 (e.g. in 5GS T3510). The AMF after receiving the Registration Request message, transmits an Identity Request message, at 402, requesting to the UE to send SUCI. The UE on receiving SUCI transmits a new SUCI (SUCI 2 in the FIG. 6), at 603, in identity Response message and start a timer T2. Therefore, there could be two options, either steps 604*a* to 605*a* or steps 604*b* to 605*b*, to be taken when the UE initiates deregistration procedure due to power off, USIM is removed or 5GS capability is disabled. At 604*a*-605*a*, when the timer T1 expires but T2 is still running, the UE resends the Deregistration. Request message to the AMF containing the SUCI (SUCI 2 in the FIG. 6) sent in the identity response message in step 603. In other words, the UE reuses the SUCI that was sent in the identity Response message in step 603 for sending a Deregistration Request message if the T2 is still running. At 604*b*-605*b*, when the timer T1 expires and T2 is not running, the UE resends the Deregistration Request message to the AMF containing a new SUCI (SUCI 3 in the FIG. 6). In other words, the UE generates the new SUCI by encryption of the SUPI for sending a Deregistration Request message if the T2 expires. At 606, the AMF may send a Deregistration Accept message to the UE.

In one example the Deregistration Request message sent after step 603 always contains a new SUCI derived from the SUPI i.e. the Deregistration Request message in step 605*a* and 605*b* contains a new SUCI derived from SUPI.

In one example in the step 601 605*a* and 605*b*, the UE does not send Registration Request message or Deregistration Request message with integrity protected even though the UE has a current 5G NAS security context i.e. the UE shall send Registration Request message without integrity protected if the Registration Request message contains a SUCI and the UE has a current 5G NAS security context or the UE shall send Deregistration Request message without integrity protected if the Deregistration Request message contains a SUCI and the UE has a current 5G NAS security context. The AMF processes the Registration Request message containing a SUCI if Registration Request message is not integrity protected and the AMF has a current 5G NAS security context for the UE, The AMF proceeds with the registration procedure. The AMF processes the Deregistration Request message containing a SUCI if Deregistration Request message is not integrity protected and the AMF has a current 5G NAS security context for the UE. The AMF proceeds with the Deregistration procedure.

In one example in the step 601 605*a* and 605*b*, the UE sends Registration Request message or Deregistration Request message with integrity protected if the UE has a current 5G NAS security context. The AMF shall not perform integrity check on Registration Request if Registration Request message contains a SUCI and the AMF has a current 5G security context. The AMF proceeds with the registration procedure. The AMF shall not perform integrity check on Deregistration Request message if the Deregistration Request message contains a SUCI and the AMF has a current 5G NAS security context. The AMF proceeds with the deregistration procedure.

In one example of this embodiment, in step 605*a* and 605*b*, if the UE is in 5GMM IDLE state then the UE sends the same Requested NSSAI during the RRC connection establishment procedure which was sent in the step 401 during RRC connection establishment procedure. This Requested NSSAI is used to send the Deregistration Request message to the same AMF to which Registration Request message was sent in step 401.

In one example the in step 605*a* and 605*b*, the UE shall send same UE identity during RRC connection establishment procedure (e.g. in RRC Connection Request message) which was sent during RRC connection establishment procedure (e.g. RRC Connection Request message) in step 601. The NG-RAN node shall use this UE identity to send the Deregistration Request message in 605*a* and 605*b* to the AMF to which the Registration Request message was sent in the step 601. This procedure is used for the case when the NG-RAN still have the N2 connection established with the AMF for the UE.

In another embodiment of the present disclosure, any NAS messages mentioned above may be transmitted between the UE and AMF via a NG-RAN node (e.g. gNB). Furthermore, a part of sequences, procedures or messages mentioned above may be not always needed for identifying one or more disclosures. In at least one of the embodiments above, one time identifier that is different from the SUCI may be used instead of the SUCI. Additionally or alternatively the term "one time identifier" is denoted as "temporary identifier" valid for only one NAS procedure.

The User Equipment (or "UE", "mobile station", "mobile device" or "wireless device") in the present disclosure is an entity connected to a network via a wireless interface. It should be noted that the UE in this specification is not limited to a dedicated communication device, and can be applied to any device, having a communication function as a UE described in this specification, as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery.

It will be appreciated that the terms "UE" and "wireless device" also encompass devices that remain stationary for a long period of time.

A UE may, for example, be an item of equipment for production or manufacture and/or an item of energy related machinery (for example equipment machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE may support one or more IoT or MTC applications. Some examples of MTC applications are listed in the Table 1 (source: 33GPP TS 22.368 [3], Annex B, the contents of which are incorporated herein by reference). This list is not exhaustive and is intended to be indicative of some examples of machine-type communication applications.

TABLE 1

Some examples of machine-type communication applications.

| Service Area | MTC applications |
| --- | --- |
| Security | Surveillance systems |
| | Backup for landline |
| | Control of physical access (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and embodiments described in the present document. Needless to say, these technical ideas and embodiments are not limited to the above-described UE and various modifications can be made thereto.

Figure 7:
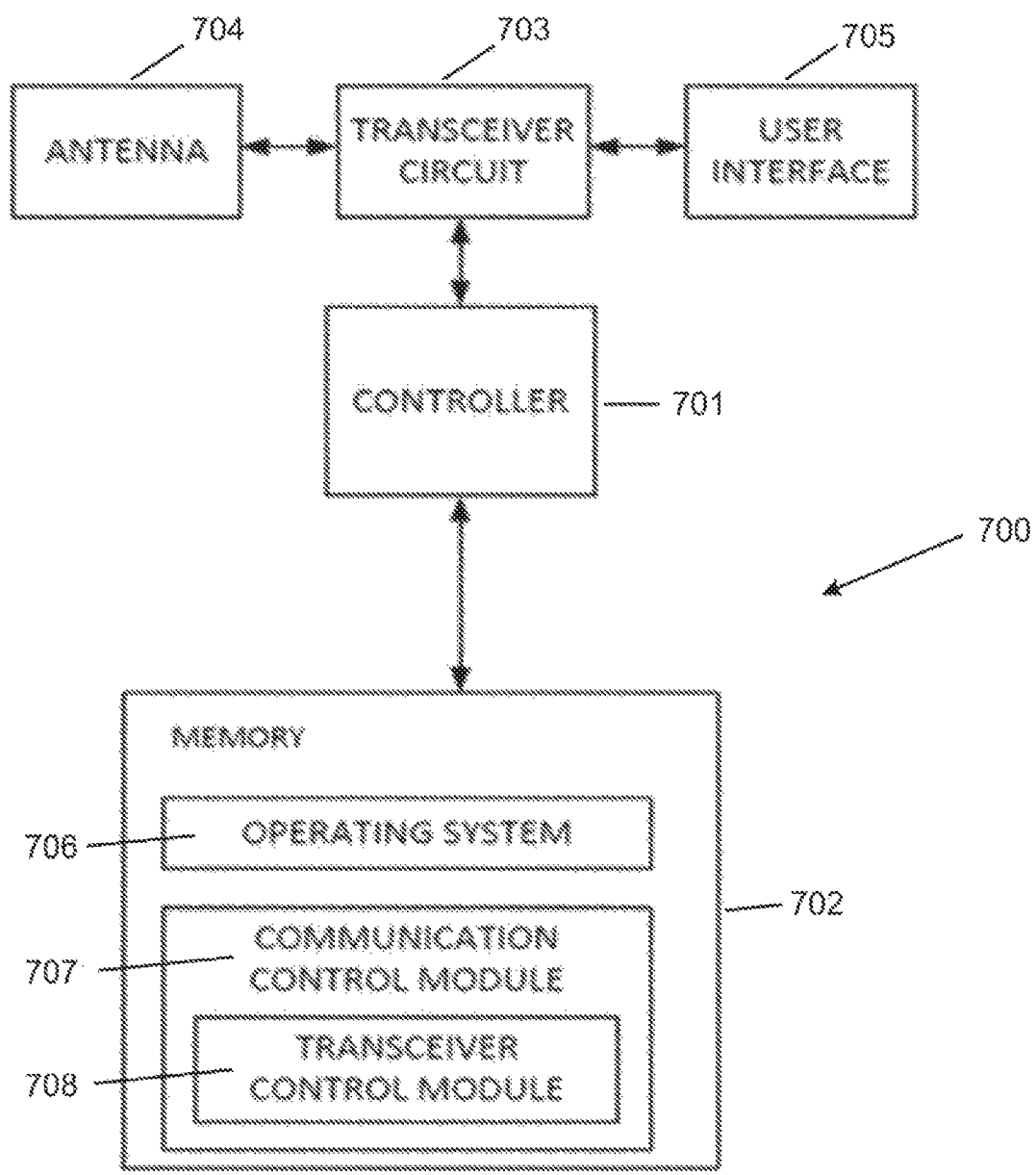
FIG. 7 illustrates general block diagram for UE in accordance with the present disclosure.

FIG. 7 is a block diagram illustrating the main components of the UE 700. As shown, the UE includes a transceiver circuit 703 which is operable to transmit signals to and to receive signals from the connected node(s) via one or more antenna 704. Although not necessarily shown in FIG. 7, the UE will of course have all the usual functionality of a conventional mobile device (such as a user interface) and this may be provided by any one or any combination of hardware, software and firmware, as appropriate. Software may be pre-installed in the memory and/or may be downloaded via the telecommunication network or from a removable data storage device (RMD), for example.

A controller 701 controls the operation of the UE in accordance with software stored in a memory 702. For example, the controller 701 may be realized by Central Processing Unit (CPU). The software includes, among other things, an operating system and a communications control module 707 having at least a transceiver control module 708. The communications control module 707 (using its transceiver control sub-module) is responsible for handling (generating/sending/receiving) signalling and uplink/downlink data packets between the UE and other nodes, such as the base station/(R)AN node, a MME, the AMF (and other core network nodes). Such signalling may include, for example, appropriately formatted signalling messages relating to connection establishment and maintenance (e.g. RRC messages,), NAS messages such as periodic location update related messages (e.g. tracking area update, paging area updates, location area update) etc.

Figure 8:
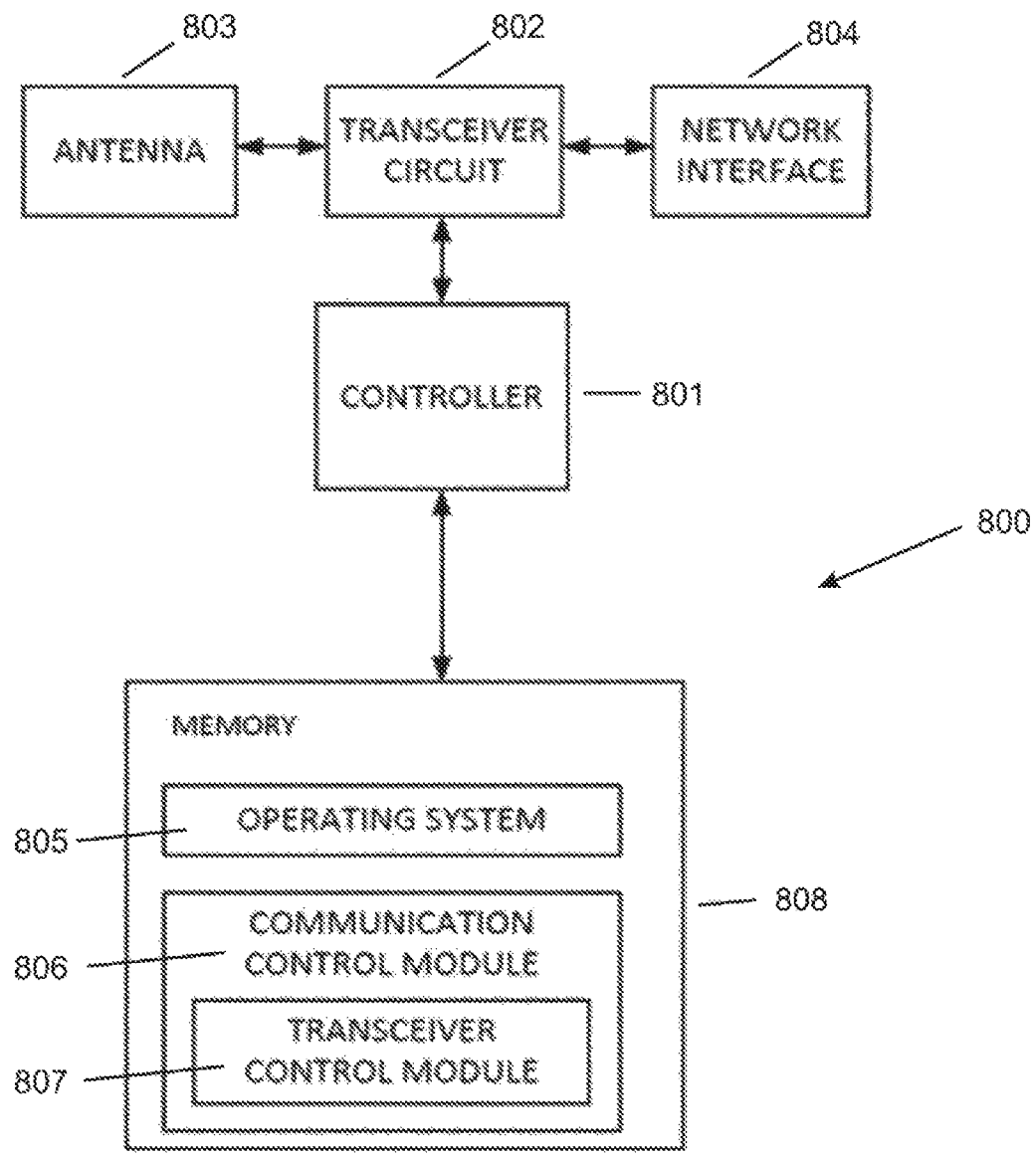
FIG. 8 illustrates general block diagram for (R)AN in accordance with the present disclosure.

FIG. 8 is a block diagram illustrating the main components of an exemplary (R)AN node 800, for example a base station ('eNB' in LTE, 'gNB' in 5G). As shown, the (R)AN node includes a transceiver circuit 802 which is operable to transmit signals to and to receive signals from connected UE(s) via one or more antenna and to transmit signals to and to receive signals from other network nodes (either directly or indirectly) via a network interface. A controller 801 controls the operation of the (R)AN node in accordance with software stored in a memory 808. For example, the controller may be realized by Central Processing Unit (CPU). Software may be pre-installed in the memory and/or may be downloaded via the telecommunication network or from a removable data storage device (RMD), for example. The software includes, among other things, an operating system and a communications control module having at least a transceiver control module.

The communications control module 806 (using its transceiver control sub-module) is responsible for handling (generating/sending/receiving) signalling between the (R)AN node and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case.

The controller is also configured (by software or hardware) to handle related tasks such as, when implemented, UE mobility estimate and/or moving trajectory estimation.

Figure 9:
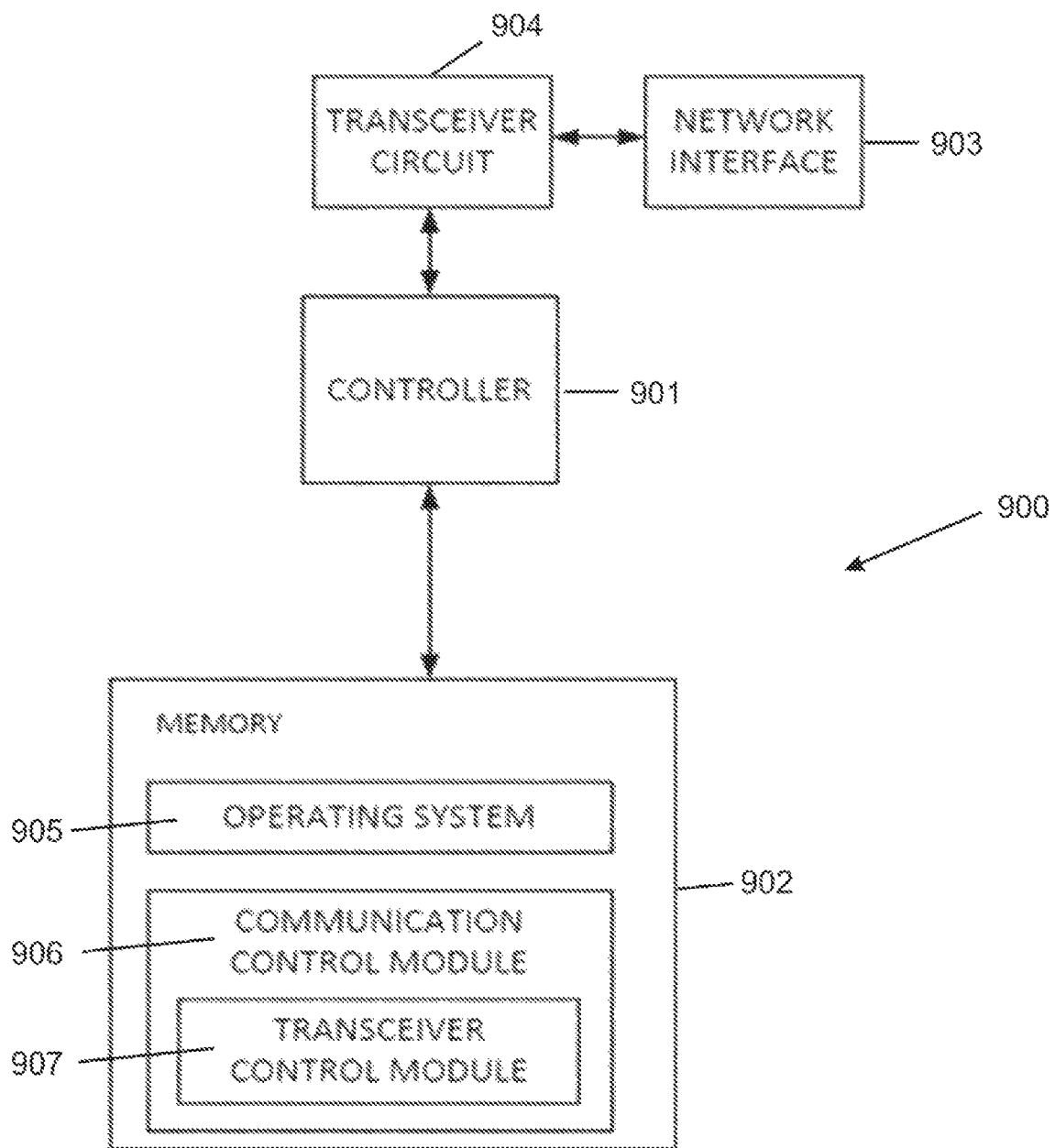
FIG. 9 illustrates general block diagram for AMF in accordance with the present disclosure.

FIG. 9 is a block diagram illustrating the main components of the AMF 900. The AMF is included in the 5GC. As shown, the AMF includes a transceiver circuit 904 which is operable to transmit signals to and to receive signals from other nodes (including the UE) via a network interface. A controller 901 controls the operation of the AMF in accordance with software stored in a memory. For example, the controller 901 may be realized by Central Processing Unit (CPU). Software may be pre-installed in the memory and/or may be downloaded via the telecommunication network or from a removable data storage device (RMD), for example. The software includes, among other things, an operating system and a communications control module having at least a transceiver control module.

The communications control module 906 (using its transceiver control sub-module) is responsible for handling (generating/sending/receiving) signalling between the AMF and other nodes, such as the UE, base station/(R)AN node (e.g. "gNB" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

Abbreviations

For the purposes of the present disclosure, the following abbreviations apply:
5GC 5G Core Network
5GS 5G System
5G-AN 5G Access Network
5G-GUTI 5G Globally Unique Temporary Identifier
5G S-TMSI 5G S-Temporary Mobile Subscription Identifier
5QI 5G QoS identifier
AF Application Function
AMF Access and Mobility Management Function
AN Access Node
AS Access Stratum
AUSF Authentication Server Function
CP Control Plane
CM Connection Management
DL Downlink
Data Network
DNAI DN Access Identifier
DNN Data Network Name
EDT Early Data Transmission
EPS Evolved Packet System
EPC Evolved Packet Core
FQDN Fully Qualified Domain Name GFBR Guaranteed Flow Bit Rate
GMLC Gateway Mobile Location Centre
GPSI Generic Public Subscription Identifier
GUAMI Globally Unique AMF Identifier
HR Home Routed (roaming)
I-RNTI Radio Network Temporary Identifier
LADN Local Area Data Network
LBO Local Break Out (roaming)
LMF Location Management Function
LRF Location Retrieval Function
MAC Medium Access Control
MFBR Maximum Flow Bit Rate
MICO Mobile Initiated Connection Only
MME Mobility Management Entity
N3IWF Non-3GPP Inter Working Function
NAI Network Access Identifier
NAS Non-Access Stratum
NEF Network Exposure Function
NF Network Function
NG-RAN Next Generation Radio Access Network
NR New Radio
NRF Network Repository Function
NSI ID Network Slice Instance Identifier
NSSAI Network Slice Selection Assistance Information
NSSF Network Slice Selection Function
NSSP Network Slice Selection Policy
PCF Policy Control Function
PEI Permanent Equipment Identifier
PER Packet Error Rate
PFD Packet Flow Description
PLMN Public land mobile network
PPD Paging Policy Differentiation
PPI Paging Policy Indicator
PSA PDU Session Anchor
QFI QoS Flow Identifier
QoE Quality of Experience
(R)AN (Radio) Access Network
RLC Radio Link Control
RM Registration Management
RQA Reflective QoS Attribute
RQI Reflective QoS Indication
RRC Radio Resource Control
SA NR Standalone New Radio
SBA Service Based Architecture
SBI Service Based Interface
SD Slice Differentiator
SDAP Service Data Adaptation Protocol
SEAF Security Anchor Functionality
SEPP Security Edge Protection Proxy
SMF Session Management Function
S-NSSAI Single Network Slice Selection Assistance Information
SSC Session and Service Continuity
SST Slice/Service Type
SUCI Subscription Concealed Identifier
SUPI Subscription Permanent Identifier
UDSF Unstructured Data Storage Function
UL Uplink
UL CL Uplink Classifier
UPF User Plane Function
UDR Unified Data Repository
URSP UE Route Selection Policy
SMS Short Message Service
SMSF SMS Function
MT Mobile Terminated

What is claimed is:

1. A method for a User Equipment (UE), the method comprising:
sending, to an Access and mobility Management Function (AMF), a Non-Access Stratum (NAS) message, the NAS message including a first Subscribed Unique Concealed Identifier (SUCI) for identifying the UE, wherein the first SUCI is generated by concealing a Subscriber Unique Permanent Identifier (SUPI) for permanently identifying the UE; and
starting a timer, in a case where the NAS message has been sent,
wherein the method further comprises:
sending, to the AMF, a Deregistration Request message, as a deregistration procedure, wherein
the Deregistration Request message includes the first SUCI that was sent in the NAS message if the timer is running, or
the Deregistration Request message includes a second SUCI that is generated by concealing the SUPI if the timer is not running, the second SUCI being different from the first SUCI.

2. The method according to claim 1, wherein
the UE initiates the deregistration procedure due to one of:
the UE switched off;
Universal Subscriber Identity Module (USIM) of the UE is removed; and
5G system (5GS) capability of the UE is disabled.

3. The method according to claim 1, wherein
the UE does not have a valid 5G Globally Unique Temporary Identifier (5G-GUTI).

4. The method according to claim 1, wherein
the NAS message is a registration request message.

5. The method according to claim 1, further comprising:
receiving an Identity Request message requesting the UE to send a SUCI,
wherein the NAS message is an Identity Response message for the Identity Request message.

6. A User Equipment (UE) comprising:
a transceiver configured to communicate with a Next Generation Radio Access Network (NG-RAN); and
a controller configured to send, to an Access and mobility Management Function (AMF) via the NG-RAN, a Non-Access Stratum (NAS) message, the NAS message including a first Subscribed Unique Concealed Identifier (SUCI) for identifying the UE,
wherein the first SUCI is generated by concealing a Subscriber Unique Permanent Identifier (SUPI) for permanently identifying the UE,
wherein the controller is further configured to:
start a timer, in a case where the NAS message has been sent, and
send, to the AMF via the NG-RAN, a Deregistration Request message, as a deregistration procedure, wherein
the Deregistration Request message includes the first SUCI that was sent in the NAS message if the timer is running, or
the Deregistration Request message includes a second SUCI that is generated by concealing the SUPI if the timer is not running, the second SUCI being different from the first SUCI.

7. The UE according to claim 6, wherein
the controller configured to initiate the deregistration procedure due to one of:

the UE switched off;
a Universal Subscriber Identity Module (USIM) of the UE is removed; and
5G system (5GS) capability of the UE is disabled.

8. The UE according to claim 6, wherein the controller does not have a valid 5G Globally Unique Temporary Identifier (5G-GUTI) and the first SUCI is available.

9. The UE according to claim 6, wherein the controller configured to send the NAS message as a registration request message including the first SUCI.

10. The UE according to claim 6, wherein:
the controller configured to send the NAS message as an Identity Response message including the first SUCI, in a case where the controller receives an Identity Request message requesting the UE to send a SUCI.

* * * * *